Patented Feb. 26, 1929.

1,703,097

UNITED STATES PATENT OFFICE.

LOUIS EMILE CHASSEVENT, OF PARIS, FRANCE.

PROCESS FOR THE MANUFACTURE OF MARBLE PLASTER.

No Drawing. Application filed April 26, 1927, Serial No. 186,822, and in France May 7, 1926.

It is a known fact that plaster of Paris will form a plastic paste only by the use of a great excess of water as compared with the amount of water absorbed by the rehydration. This excess of water will then evaporate, and the resulting product is porous and has but little strength.

For the obtainment of compact products which may be polished, two different methods are employed in current practice.

1.—There are added to the mixing water suitable foreign bodies such as glues or gelatines, zinc sulphate or the like. The stucco products thus obtained are hygroscopic and cannot be employed for outside constructions.

2.—The plaster is baked at a high temperature either alone (plaster cement) or with certain salts (Keene's cement).

The present invention relates to a process for the obtainment, without the addition of foreign bodies, of a product having the appearance of marble, by the compression of plaster of any kind, such as moulding plaster or anhydrous plasters.

The plaster is put into a mould, and water is mixed therewith; the product is then compressed. The pressure distributes the water throughout the mass and expels the air contained between the grains. The requisite pressure is 100–500 kgs. per sq. cm. but this will vary according to the type of compressing apparatus in use and to the different varieties of plaster; it depends upon the size of the grains, the thickness of the compressed layer, the diameter of the press and other factors, and should be found for each case by preliminary tests. After the compression, the mass should contain a volume represented by the water and the inner spaces which is, for 100 grams of moulding plaster, below 25 c. c. for ordinary plaster and 35 c. c. for anhydrous plaster. The amount of water should be as near as possible to the amount corresponding to the transformation of the plaster into gypsum, i. e. 19 per cent for moulding plaster and 27 per cent for anhydrous plasters. In other terms the total volume of the empty spaces within the product should not exceed 20 per cent after drying.

The plaster thus compressed is then maintained for several days in damp air.

When it is preserved in an aqueous solution, the quantity of water remaining in the mass after the compression may be less than 19 grams per 100 grams of plaster, without prejudice to the quality of the product.

The objects obtained by the above process have a very different appearance from objects obtained with plaster which is mixed in the usual conditions, i. e. with 40–70 grams of water per 100 grams of moulding plaster. The resulting product is very compact, and has from 3 to 5 times the strength of the Keene's cement, it being in fact as strong as Portland cement. It will take a good polish and has the appearance of marble. The long and expensive work of polishing may be obviated if the pressure is exercised between smooth surfaces such as that of mica.

A suitable veined or marbled aspect may be obtained in the usual conditions by adding to the plaster various colours or coloured bodies, or bodies which will furnish coloured products by double decomposition.

The special qualities of the product which is obtained by this process are due to the intimate mingling of the fine crystals which are formed during the setting of the plaster. The rate of crystallization has no effect. The compression may be effected equally well at the room temperature or at higher temperatures.

The compressed plaster is not hygroscopic. On the other hand, the product is very compact and is hardly permeable. It can be made still less permeable by the addition of suitable substances such as silicate of soda, plastic substances, gelatine which is subsequently made insoluble, and the like. Such substances may be employed as surface coatings upon the hardened product, or by adding them to the mixture before it is compressed.

The compressed plaster will afford moulded objects which are finer and stronger than what can be obtained with the plaster as usually utilized for such manufacture.

Having now described my invention, what I claim as new and desire to secure by Letters Patent is:

1. Process for manufacturing artificial marble which consists in submitting a mixture of plaster and water to such a high pressure that the amount of water contained in the compressed plaster thus obtained is substantially that corresponding to the transformation of plaster into gypsum.

2. Process for manufacturing artificial marble which consists in submitting a mixture of plaster and water to a pressure substantially from 100 to 500 atmospheres.

3. Process for manufacturing artificial marble which consists in submitting a mixture of plaster and water to such a high pressure that the total volume of the empty spaces within the compressed plaster is below 20 per cent after drying.

In testimony whereof I have signed my name to this specification.

LOUIS EMILE CHASSEVENT.